US005157787A

United States Patent [19]

Donnellan et al.

[11] Patent Number: 5,157,787

[45] Date of Patent: Oct. 27, 1992

[54] BED

[76] Inventors: Michael J. Donnellan, Cregmore; Francis McCurry, Cluain na Caighain, both of Claregalway, County Galway, Ireland

[21] Appl. No.: 751,593

[22] Filed: Aug. 21, 1991

Related U.S. Application Data

[63] Continuation of Ser. No. 521,975, May 11, 1990, abandoned.

[30] Foreign Application Priority Data

May 12, 1989 [IE] Ireland ................................ 1484/89

[51] Int. Cl.[5] ................................................ A61C 7/00

[52] U.S. Cl. ........................................... 5/610; 5/614; 5/618

[58] Field of Search ..................... 5/60, 62, 63, 66–69, 5/80, 423

[56] References Cited

U.S. PATENT DOCUMENTS

| | | | |
|---|---|---|---|
| 3,393,004 | 7/1968 | Williams | 5/62 X |
| 3,465,373 | 9/1969 | Wilson | 5/68 |
| 3,579,671 | 5/1971 | Kotter | 5/62 |
| 3,724,004 | 4/1973 | Behrens | 5/68 |
| 3,739,406 | 6/1973 | Koetter | 5/62 X |
| 3,820,838 | 6/1974 | Limpach | 5/63 X |
| 4,669,136 | 6/1987 | Waters et al. | 5/69 X |
| 4,937,903 | 7/1990 | Joly et al. | 5/423 X |

*Primary Examiner*—Michael F. Trettel
*Attorney, Agent, or Firm*—Frank P. Presta

[57] ABSTRACT

A bed comprises a base framework, an intermediate framework and a mattress framework which comprises a central frame, a head frame and a foot frame. Main rams connect the intermediate framework to the base framework for raising and lowering and tilting the intermediate framework relative to the base framework. The rams pivotally engage the intermediate framework by shafts. The ram is rigidly mounted to the main framework. A pivot frame pivotally mounts the ram about a pair of pivot axes relative to the base framework to accommodate tilting of the intermediate framework.

8 Claims, 13 Drawing Sheets

BED

This application is a continuation, of application Ser. No. 07/521,975, filed May 11, 1990 abandoned.

FIELD OF THE INVENTION

The present invention relates to a bed of the type comprising a base framework, a mattress framework mounted on the base framework, the mattress framework extending longitudinally from a head end to a foot end for supporting a mattress thereon, and tilting means for tilting the mattress framework relative to the base framework.

BACKGROND TO THE INVENTION

Beds of this type are generally used in hospitals and other such institutions, however, if desired they may be used in the home as well. In general, such beds comprise a base framework and a mattress framework. A single column, in general, extends upwardly from the base framework and pivotally carries the mattress framework, which in general is a rigid framework. A screwjack, a ram, an electric motor, or other motive means is generally provided between the mattress framework and the base framework or column for tilting the mattress framework. In certain cases, the mattress framework may be provided in two parts, one part pivotally connected transversely to the other part and means may be provided for pivoting one of the parts of the mattress framework relative to the other. In general, such pivoting means generally comprise screwjacks or the like.

In certain cases, means for raising and lowering the mattress framework relative to the base framework may be provided, in general, such means may comprise either a screwjack or a ram, generally mounted in the central column for raising the central column relative to the base.

These beds, while in general they facilitate tilting of the mattress framework relative to the base framework and also in certain cases facilitate raising and lowering of the mattress framework relative to the base framework, suffer from a number of relatively serious disadvantages. For example, in general, they are relatively difficult and complex to operate. Further, where the beds are provided without a raising and lowering means, it is impossible to raise or lower the level of the mattress framework relative to the base framework. When such raising and lowering means are provided, it is generally impossible to raise and lower the mattress without altering the tilt of the mattress framework during the raising and lowering operation. This may have very serious consequences in the case of a relatively seriously ill patient.

There is therefore a need for a bed which overcomes the problems of known beds.

The present invention is directed towards providing such a bed.

OBJECTS OF THE INVENTION

One object of the invention is to provide a bed which can be operated relatively simply and easily. Another object of the invention is to provide a bed which can be produced relatively simply and easily and relatively inexpensively. A further object of the invention is to provide a bed which comprises a mattress framework which can be tilted relative to the base framework, and which can also be raised and lowered relative to the base framework. A further object of the invention is provide a bed with a mattress framework which can be tilted and raised and lowered relative to the base framework and while being raised and lowered the tilt of the mattress framework remains unaffected.

SUMMARY OF THE INVENTION

According to the invention, there is provided a bed having a head end and a foot end and comprising:

a base framework, a mattress framework extending longitudinally from the head end to the foot end for supporting a mattress, an intermediate framework for supporting the mattress framework, tilting means for tilting the intermediate framework relative to the base framework, the tilting means comprising, longitudinally spaced apart first and second main rams connected between the base framework and the intermediate framework, the first main ram being pivotally connected to one of the said frameworks, and the main rams being independently operable relative to each other for tilting the intermediate framework relative to the base framework.

In one embodiment of the invention, the first main ram is pivotally connected to the said framework about a pair of spaced apart, transversely disposed first and second pivot axes.

In another embodiment of the invention, the first main ram is pivotally connected to the base framework by an elongated pivot member pivotally connected to the base framework about the first pivot axis and depending downwardly therefrom, the pivot member pivotally carrying a pivot frame about the second pivot axis, the first main ram being rigidly connected to the pivot frame.

Preferably, each main ram comprises a cylinder and a piston slidable within the cylinder and a piston rod extending from the piston through the cylinder, the cylinder of the first main ram being rigidly connected to the pivot frame, and the cylinder of the second main ram being rigidly connected to the base framework, the piston rods of each main ram being pivotally connected to the intermediate framework.

Advantageously, valve means are provided for independently operating the main rams for tilting of the intermediate framework relative to the base framework and for simultaneously moving the main rams for raising or lowering the intermediate framework relative to the base framework.

Advantageously, the mattress framework comprises a central frame and a head frame pivotally connected to the central frame at one end thereof and a foot frame pivotally connected to the central frame at the other end thereof, the head and foot frames being pivotally connected to the central frame about transverse pivot axes, the head and central frames being pivotally connected to the intermediate framework about one of the transverse pivot axes, and means for pivoting the three frames relative to each other about the transverse pivot axes are provided.

In another aspect of the invention, a first secondary ram mounted on the intermediate framework operatively engages the head frame for pivoting the head frame relative to the intermediate framework and the central frame, and a second secondary ram mounted on the intermediate framework operatively engages the foot frame for pivoting the foot frame relative to the central frame.

In another embodiment of the invention, the rams are hydraulically operated rams and control circuitry comprising valve means is provided for operating the hydraulic rams.

In a further embodiment of the invention, remote control means are provided for remotely transmitting a signal for reception by the control circuitry for operating the control circuitry to operate the hydraulic rams.

In another embodiment of the invention, a delivery means for delivering a fluid medium over the mattress framework is provided, the delivery means being mounted spaced apart above the mattress framework.

ADVANTAGES OF THE INVENTION

The advantages of the invention are many. One advantage of the invention is that it provides a bed of relatively simple constuction and a bed which can be produced relatively simply, easily and relatively inexpensively. Another advantage of the invention is that it provides a bed which can be operated relatively simply and easily. A further advantage of the invention is that it provides a bed which comprises a mattress framework and a base framework, and the mattress framework can be tilted relative to the base framework without difficulty. Another advantage of the invention is that the mattress framework can be raised or lowered relative to the base framework without difficulty. Another advantage of the invention is that the mattress framework can be raised and lowered relative to the base framework without affecting the tilt of the mattress framework.

These and other advantages and objects of the invention will be readily apparent to those skilled in the art from the following description of a preferred embodiment thereof, given by way of example only, with reference to the accompanying drawings.

DETAILED DESCRIPTION OF THE INVENTION

Figure 1:
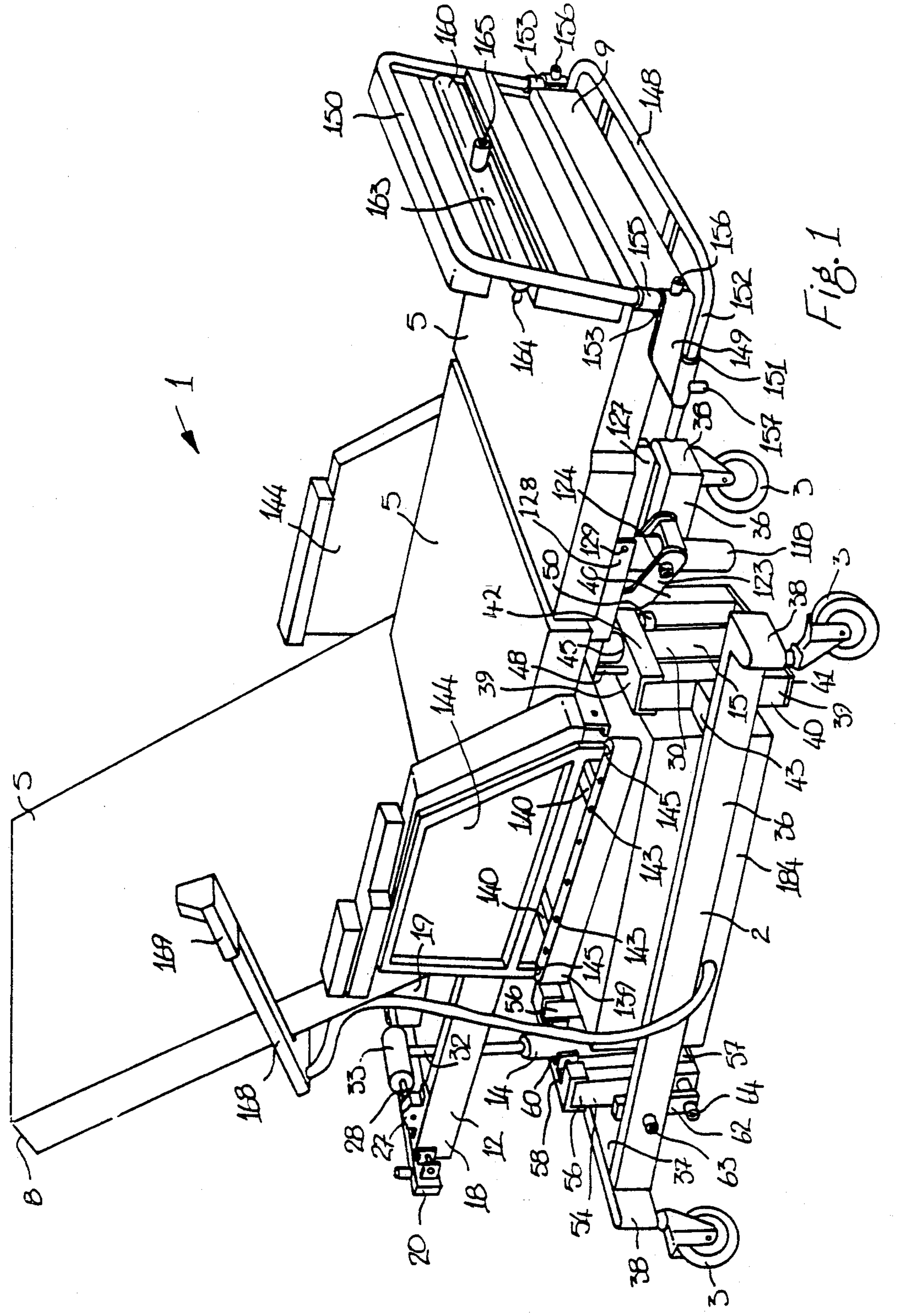
FIG. 1 is a perspective view of a bed according to the invention.
Figure 2:
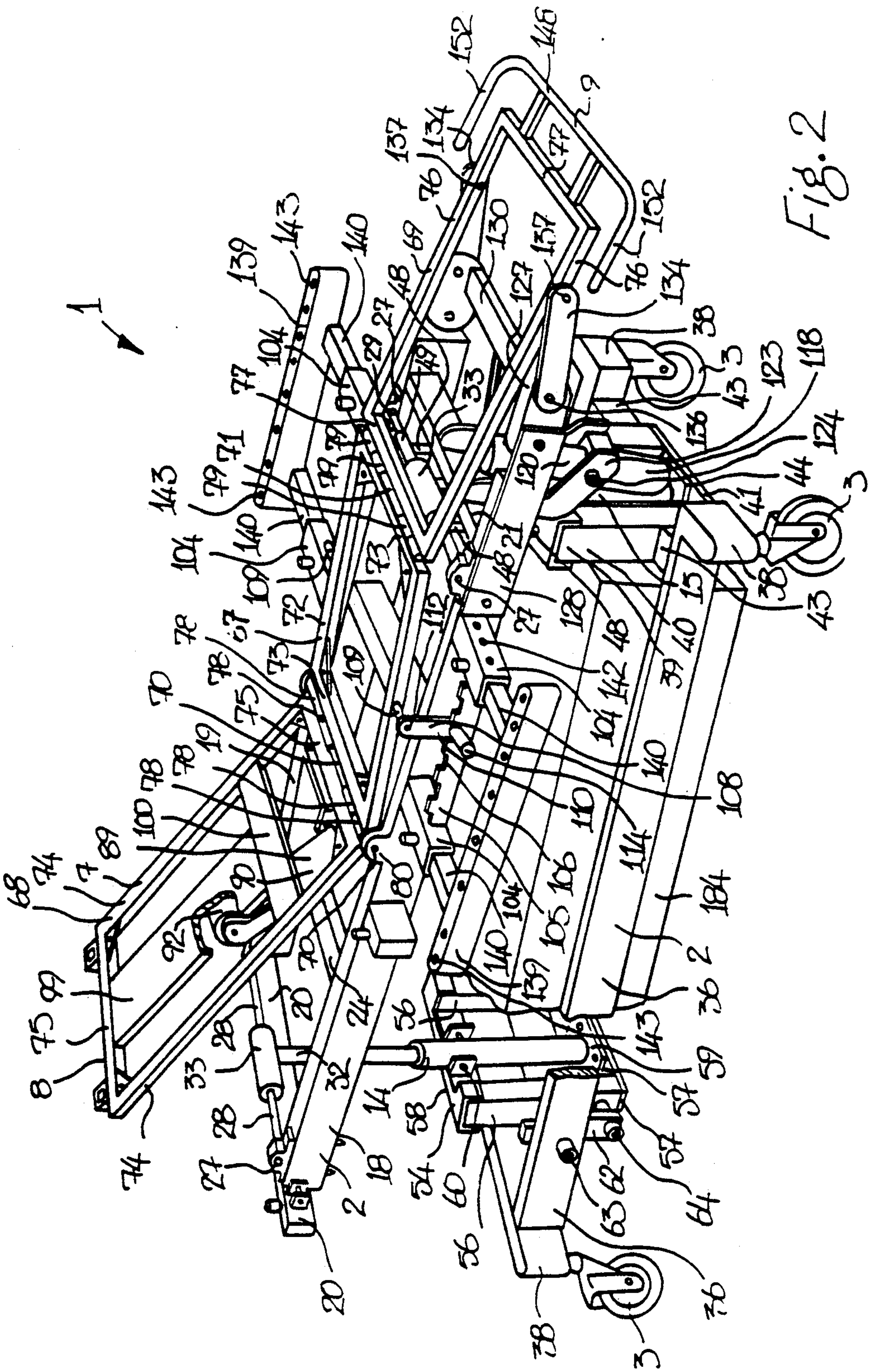
FIG. 2 is a perspective view of the bed of FIG. 1 with portion of the bed removed.
Figure 3:
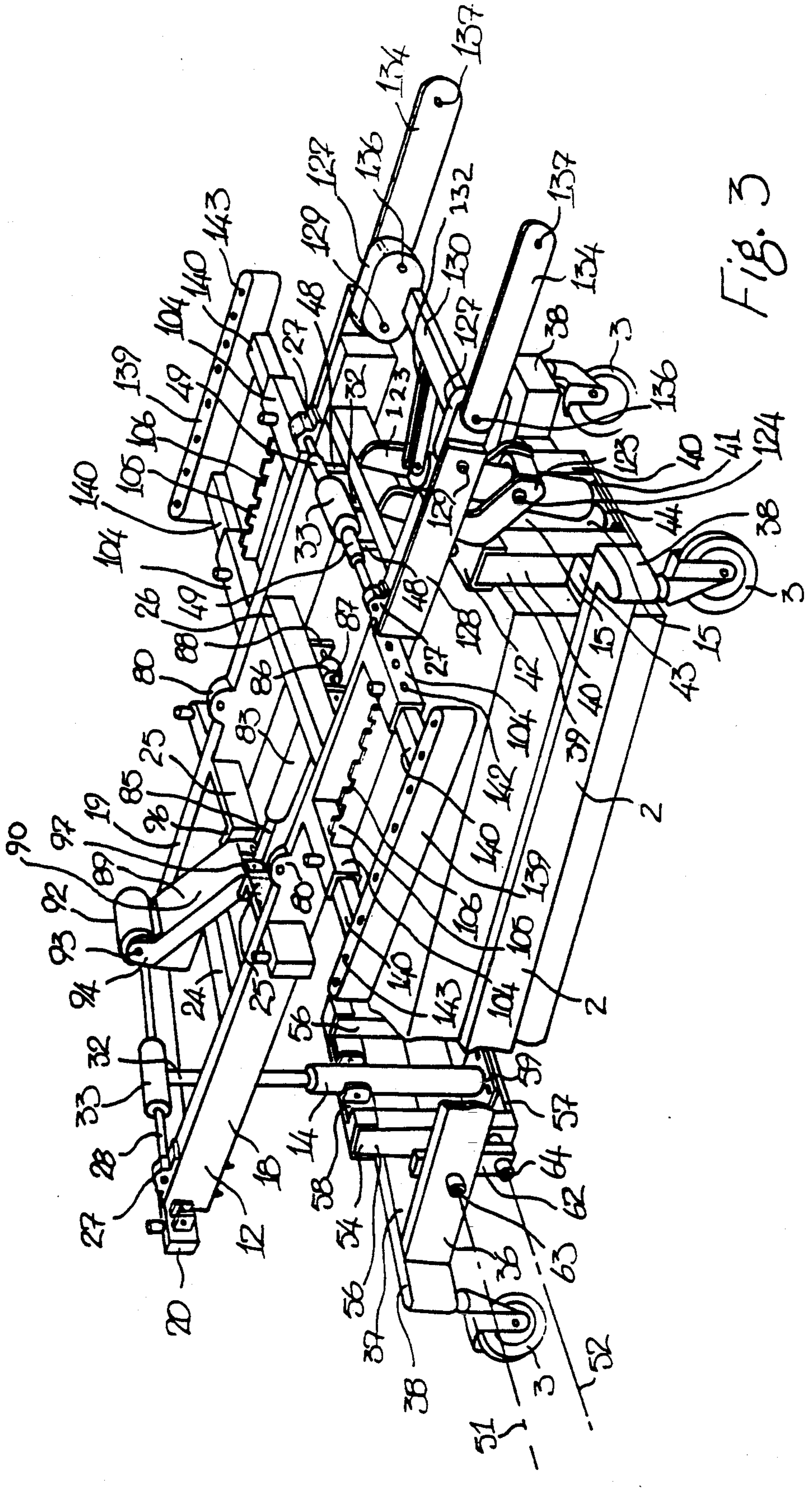
FIG. 3 is a perspective view of the bed of FIG. 1 with a further portion of the bed removed.
Figure 4:
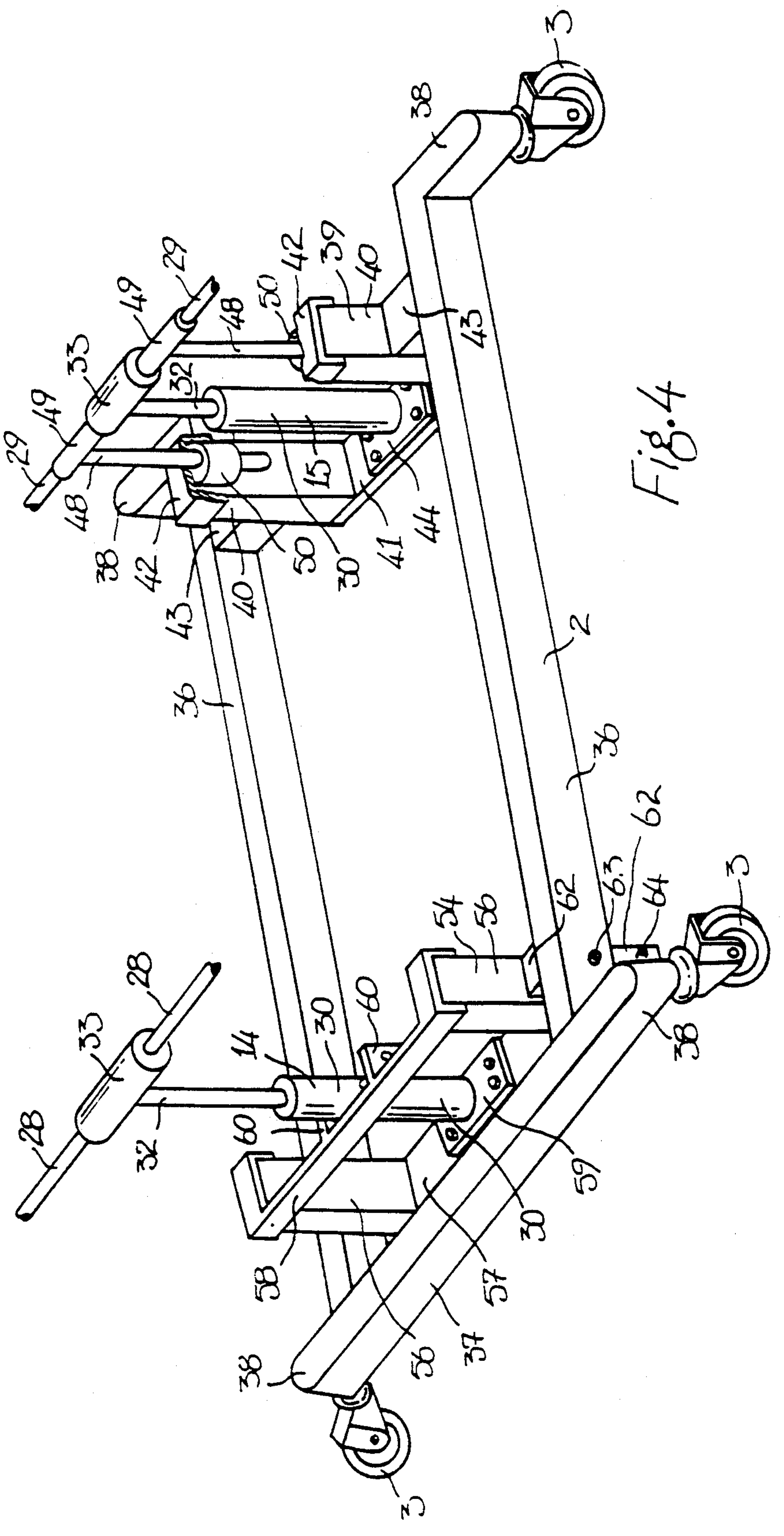
FIG. 4 is a perspective view of portion of the bed of FIG. 1.
Figure 5:
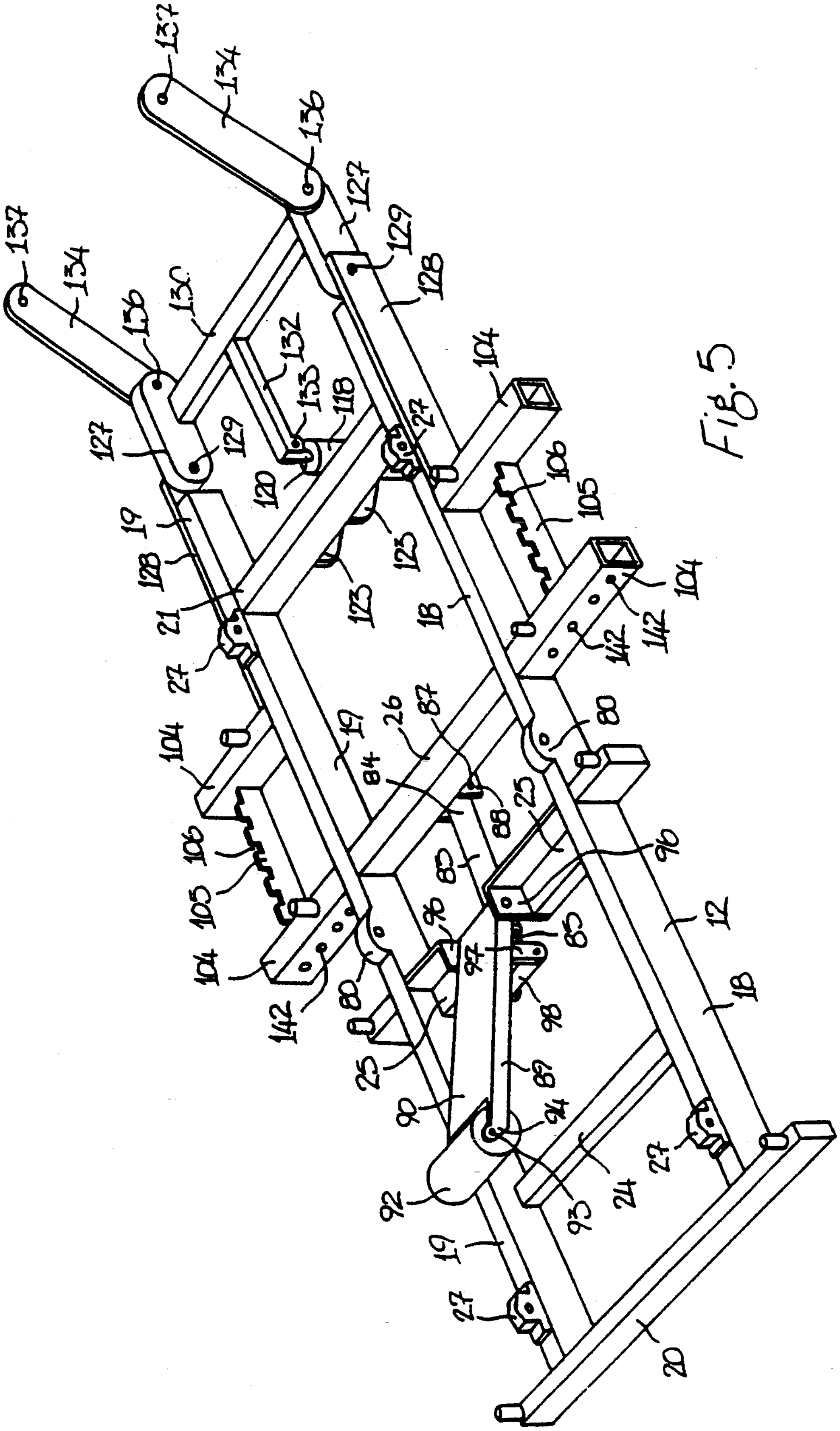
FIG. 5 is a perspective view of another portion of the bed of FIG. 1.
Figure 6:
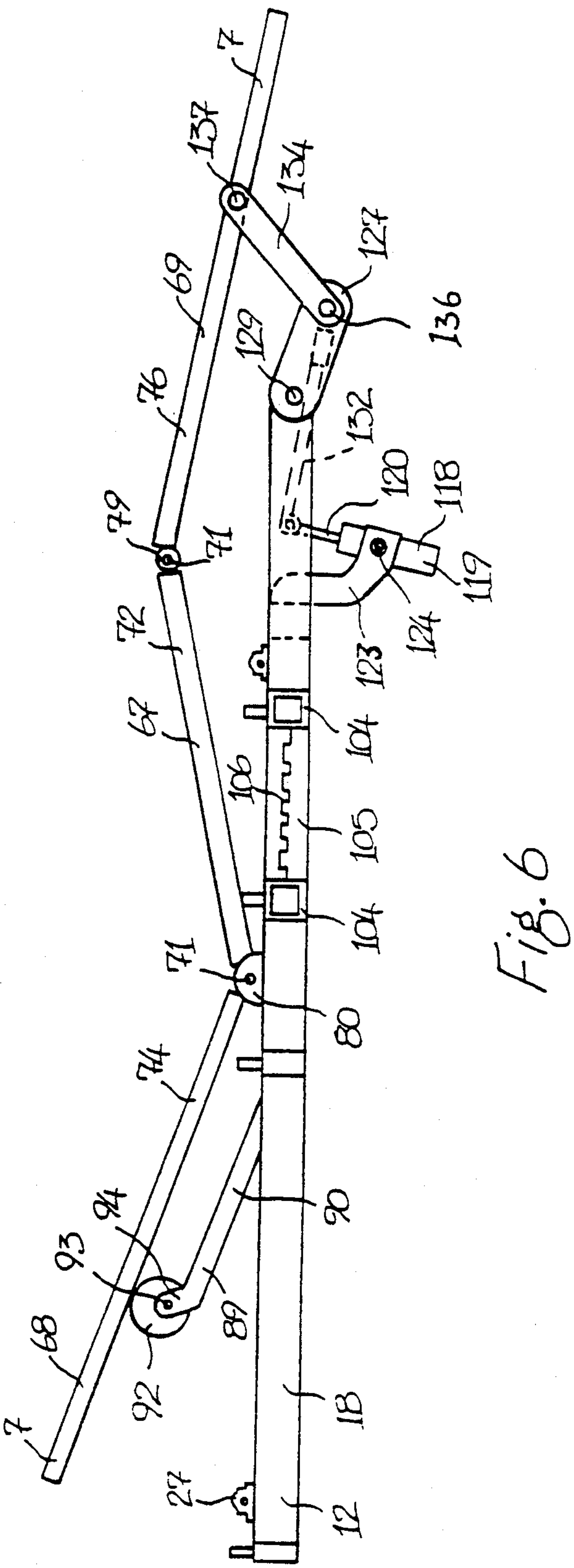
FIG. 6 is a perspective view of a further portion of the bed of FIG. 1.
Figure 7:
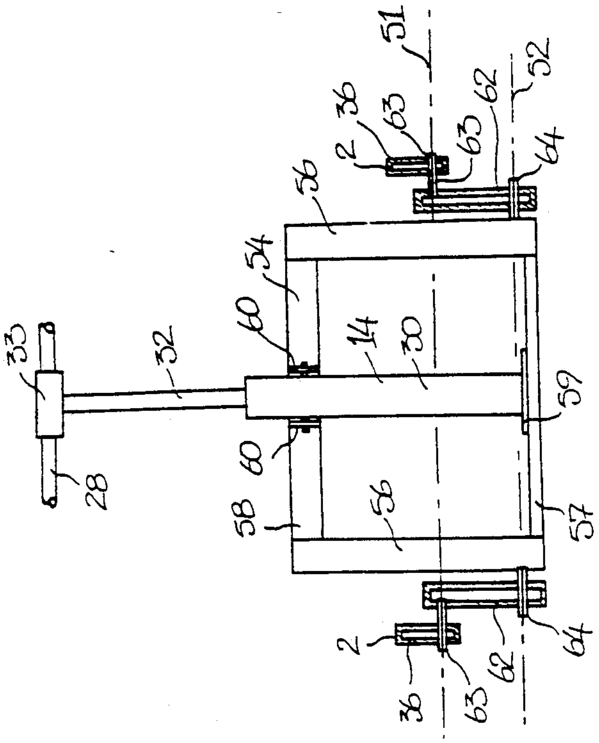
FIG. 7 is a front elevational view of a detail of the bed of FIG. 1.
Figure 18:
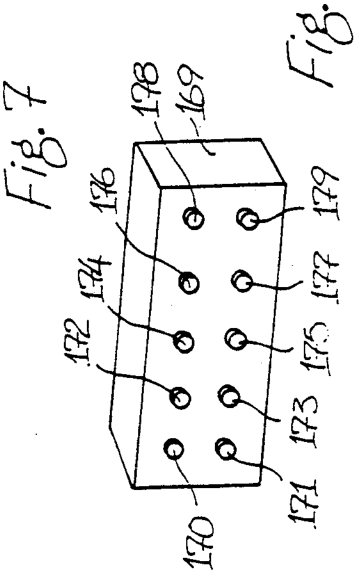
FIG. 18 is a perspective view of another portion of the bed of FIG. 1.

Referring to the drawings, there is illustrated a bed according to the invention indicated generally by the reference numeral 1. The bed 1 comprises a base framework 2 supported on ground engaging castors 3. Mattresses 5 are supported on a mattress framework 7. The mattress framework 7 and in turn the bed 1 has a head end 8 and a foot end 9. An intermediate framework 12 supports the mattress framework 7 as will be described below. The intermediate framework 12 is supported on the base framework 2 by longitudinally spaced apart first and second main hydraulic rams 14 and 15, respectively, which are connected to the base framework 2 and the intermediate framework 12 as will be described below. The first and second main rams 14 and 15 act as a tilting means for tilting the intermediate framework 12 relative to the base framework 2 with the head end higher than the foot end and vice versa. The first and second main ram 14 and 15 also act as a raising and lowering means for raising and lowering the mattress framework relative to the base framework 2. Control circuitry described below permit the first and second main rams 14 and 15 to be operated independently of each other for tilting the intermediate framework 12 and also permit the first and second rams 14 and 15 to be simultaneously raised and/or lowered for raising and lowering the intermediate framework 12 with the intermediate framework 12 horizontal or tilted.

The intermediate framework 12 comprises a pair of spaced apart side members 18 and 19 of box section stainless steel material joined by a head cross member 20 also of box section stainless steel material and a foot cross member 21 also of box section stainless steel material. Intermediate cross members 24, 25 and 26 also of stainless steel described below join the side members 18 and 19. Plumber block bearings 27 mounted on the side members 18 and 19 pivotally carry shafts 28 and 29 to which the first and second main rams 14 and 15 are connected. Each of the first and second main rams 14 and 15 comprise a hydraulic cylinder 30, and a piston 31 slidable within the cylinder 30. A piston rod 32 extends from the piston 31 through the cylinder 30, see FIG. 20. The piston rods 32 of the first and second main rams 14 and 15 are welded to sleeves 33 which engage the respective shafts 28 and 29 for pivotally connecting the piston rods 32 of the first and second main rams 14 and 15 to the intermediate framework 12.

The base framework 2 comprises a pair of side members 36 of box section stainless steel material joined by a cross member 37 also of box section stainless steel extending between the side members 36 at the head end 8. Sidewardly projecting members 38 also of box section stainless steel extending from the side members 36 carry the castors 3. A mounting frame 39 for rigidly mounting the second main ram 15 on the base framework 2 also joins the side members 36 at the foot end 9 of the base framework 2. The mounted frame 39 comprises a pair of spaced apart upstanding members 40 of box section stainless steel joined by a bottom cross member 41 of stainless steel plate material and a top cross member 42 of channel section stainless steel. Members 43 also of box section stainless steel extend from the side members 36 to engage the upstanding members 40 for rigidly securing the mounting frame 39 to the base framework 2. A mounting flange 44 on the end of the cylinder 30 of the second main ram 15 is rigidly secured to the bottom cross member 41 of the mounting frame 39 by screws (not shown) for rigidly securing the second main ram 15 to the base framework 2. An opening 45 in the top cross member 42 accommodates the cylinder 30 of the second main ram 15.

A pair of guide rods 48 extending from sleeves 49 on the shaft 29 slidably engage linear bearings 50 mounted on the upstanding members 40 of the mounting frame 39 for stabilising the intermediate framework 12 relative to the base framework 2.

Figure 9:
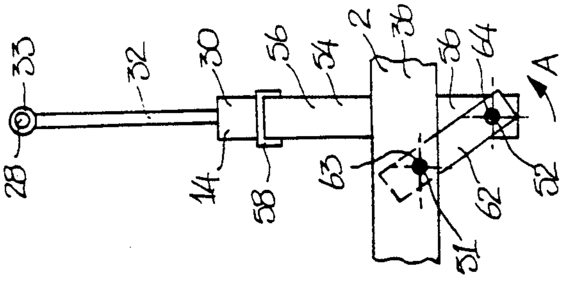
FIG. 9 is a view similar to FIG. 8 of the detail in a different position.
Figure 8:
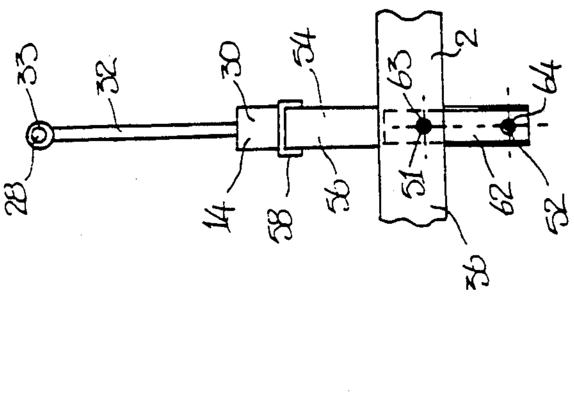
FIG. 8 is a side elevational view of the detail of FIG. 7.

The first main ram 14 is pivotally connected to the base framework 2 about a pair of spaced apart, transversely disposed pivot axes 51 and 52 by a pivot frame 54 to facilitate tilting of the intermediate framework 12 relative to the base framework 2. The pivot frame 54 comprises a pair of upstanding members 56 of box section stainless steel material joined by a bottom cross member 57 of plate stainless steel and a top cross member 58 also of plate stainless steel material. A mounting flange 59 extending from the base of the cylinder 30 of the first main ram 14 is secured to the bottom cross member 57 by screws (not shown) for rigidly securing the first main ram 14 to the pivot frame 54. Brackets 60 secure the cylinder 30 of the first main ram 14 to the top cross member 58. A pair of elongated pivot members 62 pivotally connected to the side members 36 of the base framework 2 about the first pivot axis 51 by pivot pins 63 depend downwardly and support the pivot frame 54 about the second pivot axis 52 by pivot pins 64. The pivot pins 64 extend from the pivot frame 54 and pivotally engage the pivot members 62. The pivot pins 63 extend from the pivot members 62 and pivotally engage the side members 36 of the base framework 2. The fact that the pivot frame 54 is pivotal about the pivot axis 52 and the pivot members 62 are pivotal about the pivot axis 51 permits the pivot members 62 to pivot in the direction of the arrow A, see FIG. 9, thereby permitting the pivot frame 54 to move towards the mounting frame 39 to accommodate the shortening of the distance between the first and second main rams 14 and 15 as the intermediate framework 12 tilts relative to the base framework 2. The pivot frame 39 pivots in the reverse direction to accommodate tilting of the intermediate framework 12 in the reverse direction.

The mattress framework 7 comprises three frames, namely a central frame 67, a head frame 68 and a foot frame 69 which are respectively pivoted to the central frame 67 about transverse pivot axes defined by pivot shafts 70 and 71. All frames 67 to 69 are of box section stainless steel material. The central frame 67 comprises a pair of side members 72 joined by cross members 73. The head frame comprises a pair of side members 74 joined by cross members 75. The foot frame comprises a pair of side members 76 joined by cross members 77. Pivot brackets 78 extending from adjacent cross members 73 and 75 of the central and head frames 67 and 68, respectively, pivotally engage the pivot shaft 70 to facilitate relative pivotal movement of the frames 67 and 69. Pivot brackets 79 extending from the cross members 73 and 77 of the central and foot frames 67 and 69, respectively, pivotally engage the pivot shaft 71 to facilitate relative pivotal movement of the frames 67 and 69. A pair of pivot brackets 80 extending from the side members 18 and 19 of the intermediate framework 12 pivotally engage the pivot shaft 70 for pivotally connecting the central frame 67 and head frame 68 to the intermediate framework 12.

Figure 10:
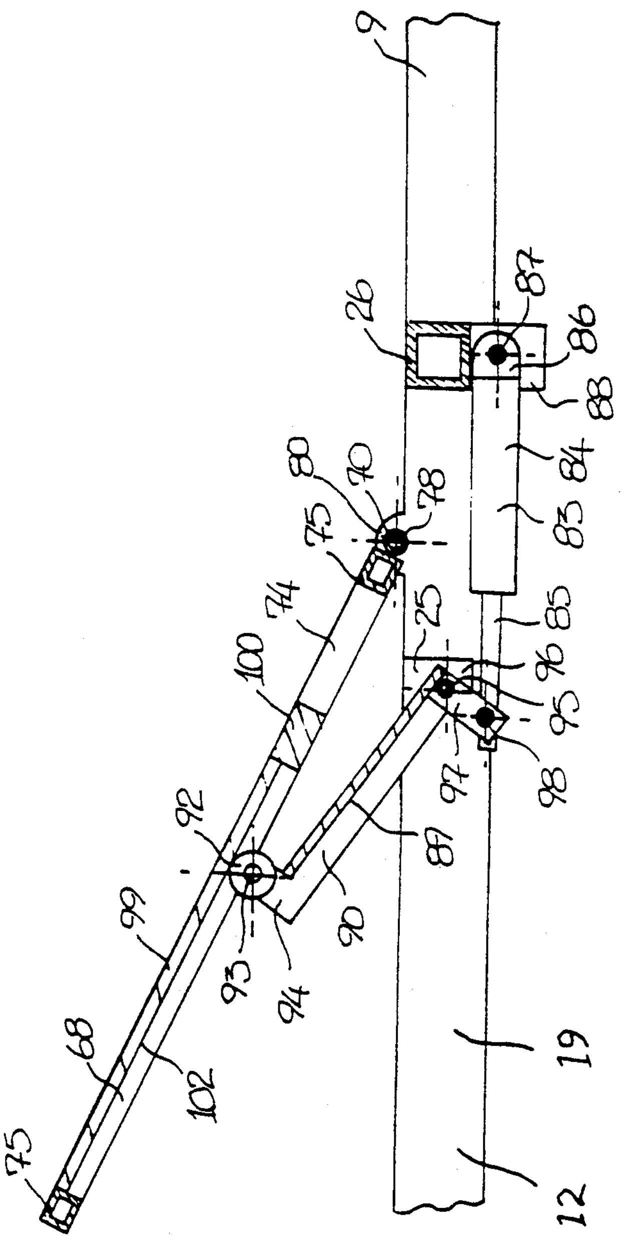
FIG. 10 is a side elevational view of another detail of the bed of FIG. 1.
Figure 11:
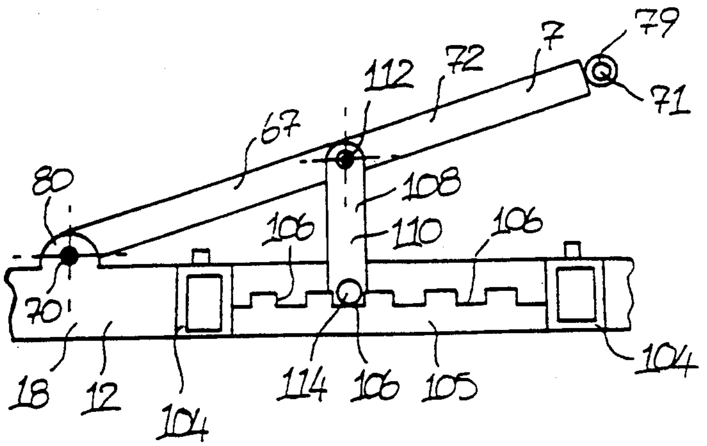
FIG. 11 is a side elevational view of a further detail of the bed of FIG. 1.
Figure 12:
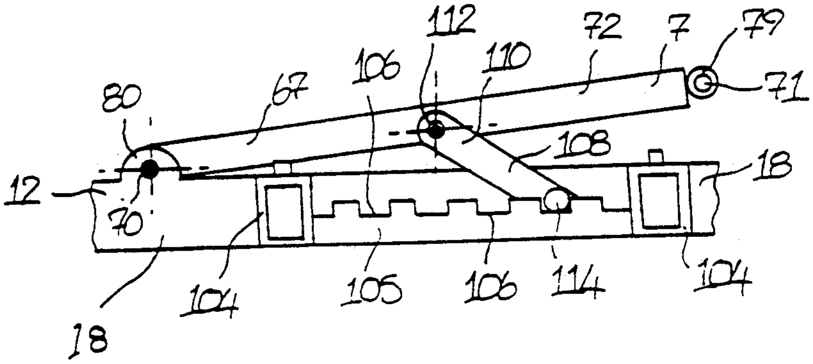
FIG. 12 is a side elevational view of the detail of FIG. 11 in a different positon.
Figure 13:
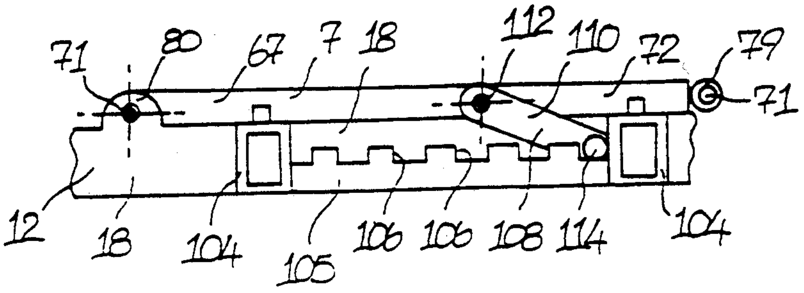
FIG. 13 is a side elevational view of the detail of FIG. 11 in a still further different positon.
Figure 14:
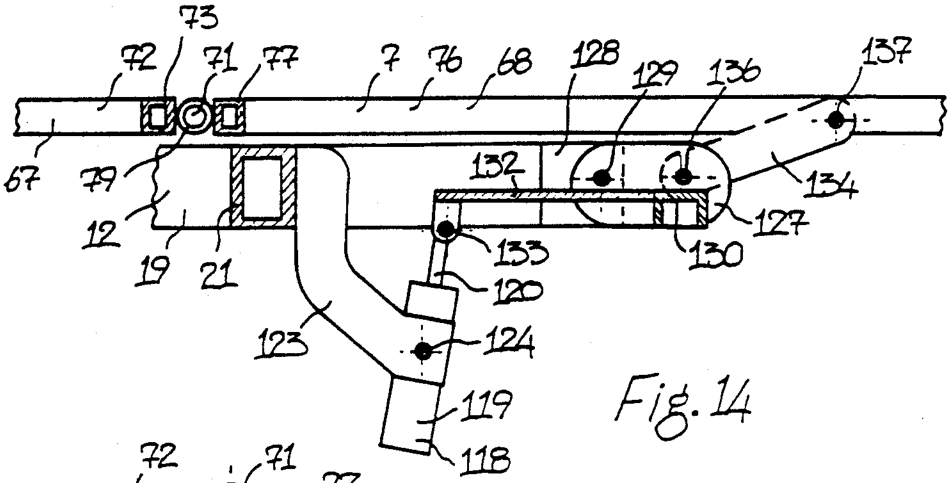
FIG. 14 is a side elevational view of another detail of the bed of FIG. 1.

Means for pivoting the head frame 68 relative to the central frame 67 and the intermediate framework 12 comprises a first secondary hydraulic ram 83 mounted on the intermediate framework 12 and operatively engaging the head frame 68 by a pivot linkage described below. The hydraulic ram 83 comprises a hydraulic cylinder 84, a piston 82 slidable in the cylinder 84 and a piston rod 85 extending from the piston 82 through the cylinder 84, see FIG. 20. A mounting bracket 86 mounted on the end of the cylinder 84 pivotally engages a pivot pin 87 carried on brackets 88 extending downwardly from the intermediate cross member 26, see FIG. 10. A pivot linkage 89 comprising a pivot member 90 of channel section stainless steel rotatably carries a roller 92 on a shaft 93 on a bracket 94 extending from the pivot member 90. The pivot member 90 is pivotally mounted on the intermediate cross members 25 on a pivot shaft 95 carried on brackets 96 extending upwardly from the intermediate cross members 25. Downwardly extending brackets 97 from the pivot member 90 carry a pivot pin 98 which pivotally engages the piston rod 85 of the ram 83. A longitudinal member 99 of channel section stainless steel extends between one of the cross members 75 of the head frame 68 and an intermediate cross member 100 extending between the side members 74 of the head frame 68. The longitudinal member 99 defines a surface 102 which is engagable with the roller 92 of the pivot member 90 for pivoting the head frame 68 relative to the central frame 67 and the intermediate framework 12 on operation of the ram 83. The intermediate cross member 24 extending between the side members 18 and 19 of the intermediate framework 12 supports the pivot member 90 and in turn the head frame 68 when the ram 83 is in the fully retracted condition.

Sidewardly extending side members 104 of stainless steel box section material extend from the side members 18 and 19 of the intermediate framework 12 and carry members 105 having a plurality of notches 106 formed therein. Means for pivoting the central frame 67 relative to the head frame 68 and the intermediate framework 12 comprises a pair of cranked support members 108 pivotally carried on sidewardly extending shafts 109 extending from the side members 72 of the central frame 67. The cranked support members 108 comprise members 110 pivotally mounted to the support shafts 109 by pivot pins 112 and notch engaging members 114 extending outwardly from the members 110 for engaging selected notches 106 of the members 105 for supporting the central frame 67 at a desired angle relative to the intermediate framework 12.

Means for pivoting the foot frame 69 relative to the central frame 67 and the intermediate framework 12 comprises a second secondary hydraulic ram 118 pivotally mounted on the intermediate framework 12 and operatively connected to the foot frame 69 by a linkage described below. The hydraulic ram 118 comprises a hydraulic cylinder 119 and a piston 121 slidable within the hydraulic cylinder 119. A piston rod 120 extends from the piston 121 through the cylinder 119, see FIG. 20. A pair of bracket members 123 extend from the foot cross member 21 and carry a pivot pin 124 which pivotally supports a mounting block 125 which in turn carries the ram 118. Side members 127 extend from the side members 18 and 19 and are pivotally connected relative to the side members 18 and 19 by mounting brackets 128. The mounting brackets 128 carry pivot pins 129 which pivotally support the side members 127.

A cross member 130 extends rigidly between the side members 127 and carries an arm 132 which is pivotally connected to the piston rod 120 of the ram 118 at 133 for pivoting the side members 127 relative to the intermediate framework 12. A pair of linkage members 134 are pivotally connected to respective side members 127 by pivot pins 136 and to respective side members 76 of the foot frame 69 by pivot pins 137. Accordingly, on the piston rod 120 extending from the cylinder 119 of the ram 118 the side members 127 are pivoted downwardly relative to the intermediate framework 12, in the direction of the arrow B, see FIG. 15. This causes the foot frame 69 to pivot downwardly relative to the central frame 69. Retraction of the piston rod 120 into the cylinder 119 of the ram 118 causes the foot frame 69 to pivotal upwardly relative to the central frame 67.

Accessory support members 139 for supporting accessories are slidably engagable with the side members 104. Each accessory support member 139 carries a pair of members 140 which slidably engage the side members 104. A plurality of holes 142 in the side members 104 align with a corresponding hole (not shown) in the members 140 for mounting the accessory support members 139 in a desired position spaced apart from the side members 18 and 19 of the intermediate framework 12. Clevice pins (not shown) are provided for engaging the holes 142 in the side members 104 and the holes (not shown) in the members 140 for securing the accessory support members 139 in the desired position. Holes 143 in the accessory support members 139 are provided for engaging various accessories. In FIG. 1, a pair of side panels 144 are illustrated mounted on the accessory support members 139. Downwardly extending pins 145 from the side panels 144 engage two of the respective holes 143 in the accessory support members 139. However, it will be appreciated that many other accessories could be mounted in the accessory support members 139, for example, a tray, an armrest, or any other desired device which a patient may wish to have mounted adjacent to them.

A U-shaped support bracket 148 mounted on one of the cross members 77 of the foot frame 69 slidably carries mounting brackets 149 for mounting attachments at the foot of the bed 2. In this embodiment of the invention, a foot end frame 150 is illustrated mounted on the mounting brackets 149. Bores 151 in the mounting brackets 149 slidably engage side members 152 of the U-bracket 148. Bores 153 through the mounting brackets 149 releasably engage spigots 155 extending from the foot end frame 150. Grub screws 156 in the mounting brackets 149 extend into the bores 153 for securing the spigots 155 therein. Grub screws 157 in the mounting brackets 149 secure the mounting brackets 149 at a desired position along the side members 152 of the U-bracket 148. Needless to say, if desired, any other suitable attachment or accessory may be mounted in the mounting members 149 at the foot of the bed.

Delivery means for delivering a fluid over the mattress framework 7 and in turn over the mattress 5 and patient lying on the bed comprises a manifold 160 mounted in the foot end frame 150. In this embodiment of the invention, the manifold 160 delivers air at a controlled temperature over the patient. The manifold 160 comprises an elongated hollow tubular member 163 having a plurality of jets 164 extending therefrom for delivering the air. An air inlet port 165 is provided to the tubular member 163 for connecting to a supply of air at the desired temperature and h ımidity. It is envisaged in practice that a supply of slightly heated air would be delivered to the manifold 160 for delivering a curtain type stream of air over the patient. Needless to say, if desired, chilled air or the like or specially treated, for example, sterile air or the like could be delivered to the manifold 160.

Mounting brackets 166 are provided on one of the cross members 75 of the head frame 68 for receiving a headboard (not shown) or other attachment or accessory, neither of which are shown.

A support member 168 extends from one of the side members 74 of the head frame 68 and carries a control panel 169 which carries controls for enabling a patient to control the operation of the main rams 14 and 15 and secondary rams 83 and 118. Ten button switches 170 to 179 are provided on the control panel 169 for controlling the operation of the rams through control circuitry which will be described below. The button switches 170 and 171 control respectively the upward movement and downward movement of the first main ram 14. The button switches 172 and 173 control the upward and downward movement respectively of the second main ram 15. The button switches 174 and 175 control the extension and retraction movement, respectively, of the first secondary ram 83 for operating the head frame 68. The button switches 176 and 177 control the extension and retraction, respectively, of the ram 118 for pivoting the foot frame 69 relative to the central frame 67. The button switch 178 permits the first and second main rams 14 and 15 to be raised simultaneously while the button switch 179 permits the first and second main rams 14 and 15 to be lowered simultaneously.

In this particular embodiment of the invention, the main rams 14 and 15 and the secondary rams 83 and 118 are so arranged that each 1 millimeter of movement of the piston rod of each ram gives 1° of tilt or incline to the frame or framework which it operates.

The rams 14, 15, 83 and 118 are all double-acting rams and each are provided with two ports for receiving hydraulic lines from valve means described below of the control circuitry, also described below. The ports and hydraulic lines are only illustrated in FIG. 20.

A housing 184 is mounted in the base framework 2 for housing the hydraulic and electrical circuitry for controlling the operation of the main rams 14 and 15 and the secondary rams 83 and 118.

Figure 20:
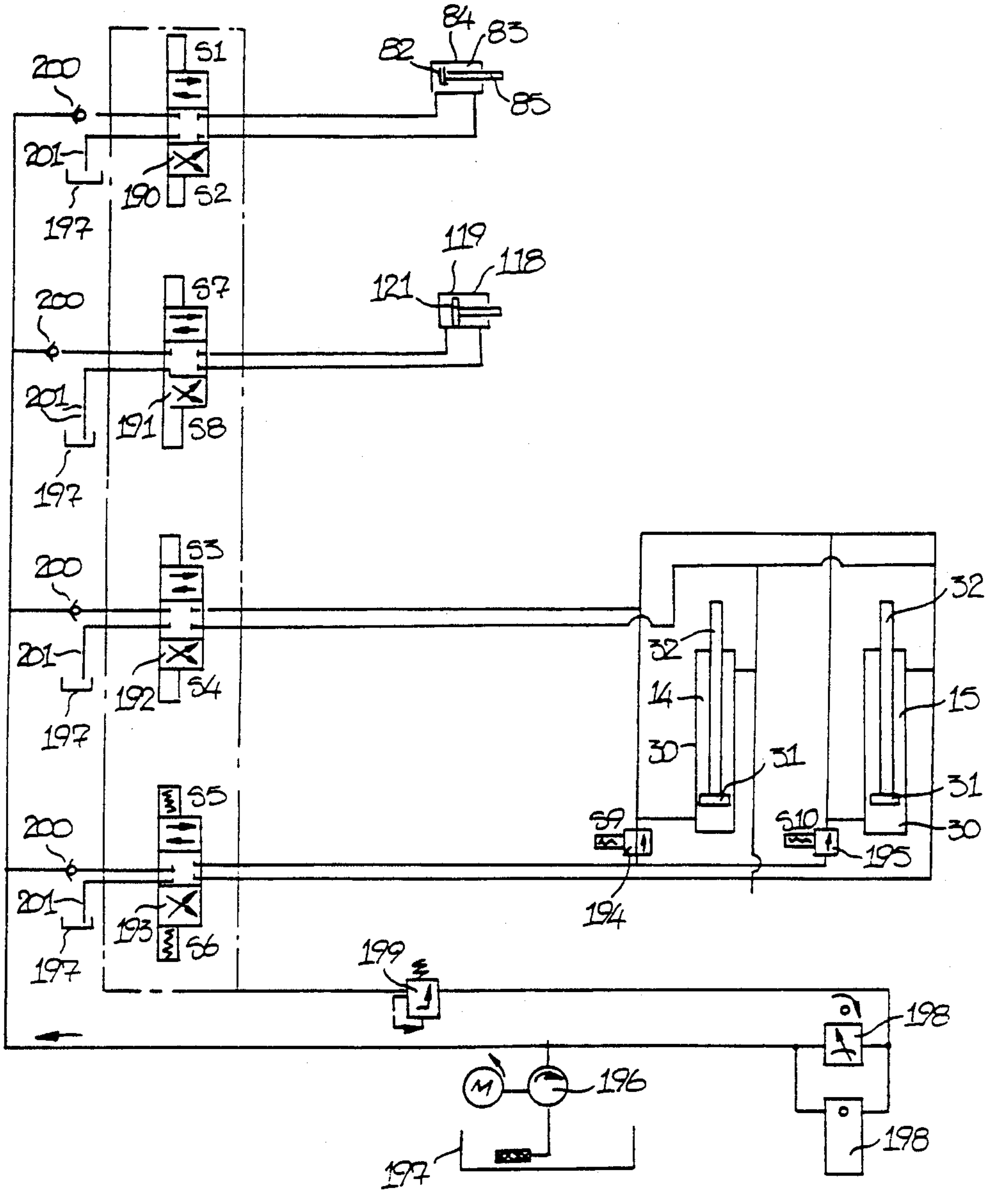
FIG. 20 is a hydraulic circuit diagram of control circuitry of the bed of FIG. 1.
Figure 21:
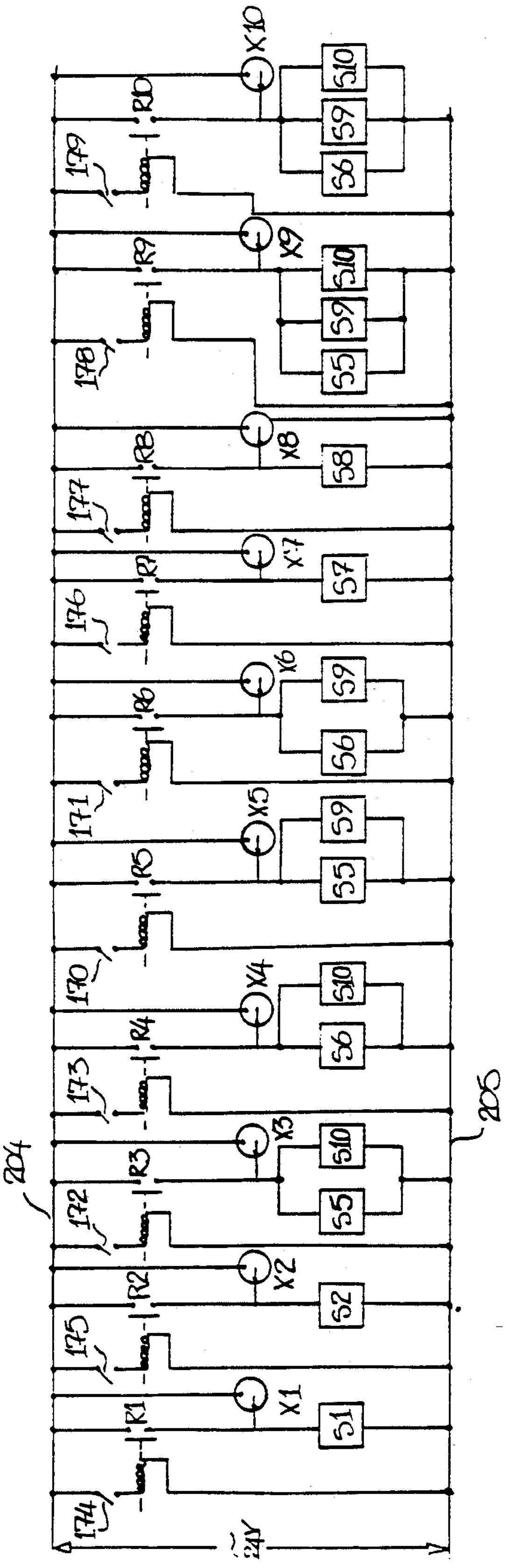
FIG. 21 is an electrical circuit diagram of the control circuitry of the bed of FIG. 1.

Referring now to FIGS. 20 and 21, the electrical and hydraulic circuitry for controlling the main rams 14 and 15 and the secondary rams 83 and 118 will now be described. FIG. 20 illustrates the hydraulic circuitry, while FIG. 21 illustrates the electrical circuitry. For convenience, the hydraulic circuitry will first be described with reference to FIG. 20. The hydraulic circuit comprises valve means, in this case hydraulic valves 190 to 195. The hydraulic valve 190 controls the secondary ram 83. The hydraulic valve 191 controls the secondary ram 118, while the hydraulic valves 192, 193, 194 and 195 control the operation of the main rams 14 and 15. The hydraulic valve 192 is an over-ride valve which controls the simultaneous operation of the main rams 14 and 15, as will be described below. The valve 190 is controlled by solenoid coils S1 and S2. Solenoid coils S3 and S4 control the hydraulic valve 192. The hydraulic valve 193 is controlled by solenoid coils S5 and S6, while the hydraulic valve 191 is controlled by solenoid coils S7 and S8. Solenoid coils S9 and S10 respectively control the valves 194 and 195. A motor driven pump 196 pressurizes the hydraulic circuitry and draws the hydraulic oil from a hydraulic reservoir 197. Pressure controllers 198 control the pressure of the hydraulic oil in the circuit and permit the pressure in the circuitry to be regulated. A pressure relief valve 199 protects the circuitry against excessive build-up of pressure. Pressurized oil is fed to the hydraulic valves 190 to 193 through one-way valves 200 and exhausted hydraulic oil is returned from the valves 190 to 193 to the hydraulic reservoir 197 through lines 201. To operate the ram 83 to cause the piston rod 85 to extend from the cylinder 84, the solenoid S1 of the hydraulic valve 190 is energised as will be described below. To cause the piston rod 85 to retract into the cylinder 84 of the ram 83, the solenoid coil S1 is de-energised and the solenoid coil S2 is energised. To cause the piston rod 120 of the ram 118 to extend from the cylinder 119 the solenoid coil S7 of the valve 191 is energised. The piston rod 120 is retracted into the cylinder 119 when the solenoid coil S7 is de-energised and the solenoid coil S8 is energised.

To cause the piston rod 32 of the ram 14 to extend from the cylinder 30 independently of the ram 15, the solenoid coil S5 of the hydraulic valve 193 is energised and the solenoid coil S9 of the hydraulic valve 194 is also energised, thus opening the hydraulic valve 194. To cause the piston rod 32 of the ram 14 to retract into the cylinder 30, the solenoid coil S5 of the hydraulic valve 193 is de-energised, while the hydraulic valve S6 is energised. The solenoid coil S9 of the hydraulic valve 194 is also energised. To cause the piston rod 32 of the ram 15 to extend from the cylinder 30, the hydraulic valve 193 is operated in similar fashion as just described, but the solenoid coil S10 of the hydraulic valve 195 is energised, thereby opening the hydraulic valve 195. Needless to say, in this case the solenoid coil S9 of the hydraulic valve 194 is de-energised. The piston rod 32 of the ram 15 is retracted into the cylinder 50 by leaving the solenoid coil S10 energised, de-energising the solenoid coil S5 and energising the solenoid coil S6 of the hydraulic valve 193.

Where it is desired to extend the piston rods 32 of the rams 14 simultaneously, the two hydraulic valves 194 and 195 are opened by energising the solenoid coils S9 and S10 and the solenoid coil S5 of the hydraulic valve 193 is also opened. To cause the two piston rods 32 to retract into the cylinders 30 of the rams 14 and 15 simultaneously, the hydraulic valves 194 and 195 are open by energising the solenoid coils S9 and S10, while the solenoid coil S5 is de-energised and the solenoid coil S6 is energised of the hydraulic valve 193. The piston rods 32 of the hydraulic rams 14 and 15 may also be simultaneously operated using the hydraulic valve 192 with the hydraulic valves 194 and 195 closed, in other words with the solenoids S9 and S10 de-energised. To cause the piston rods 32 of the rams 14 and 15 to extend simultaneously, the solenoid coil S3 of the valve 192 is energised. To cause the piston rods 32 to retract simultaneously into the cylinders 30 of the valves 14 and 15, the solenoid coil S4 are energised while the solenoid coil S3 is de-energised of the hydraulic valve 192.

Returning now to FIG. 21 the electrical circuitry which controls the operation of the solenoid coils S1 and S2 and S5 to S10 is illustrated. In this embodiment of the invention, the electrical circuit comprises live and neutral buses 204 and 205 respectively which are fed with a 24 volt AC supply. The solenoid coils S1, S2 and S5 to S10 are connected across the buses 204 and 205 through relays R1 to R10. The relays R1 to R10 control the selection and powering of the solenoid S1, S2 and S5 to S10. The relays R1 to R10 are operated by the button switches 170 to 179 on the control panel 169 as follows. The button switch 170 operates relay R5 which energises the solenoid coils S5 and S9 for causing the piston rod 32 of the ram 14 to extend from the cylinder 14 for tilting the head end 8 of the intermediate framework 12 upwardly. The button switch 171 activates the relay R6 which energises the solenoid coils S6 and S9 for retracting the ram 14. The button switch 172 activates the relay R3 for energising the solenoid coils S5 and S10 to extend the main ram 15, while the button switch 173 activates the relay R4, thus energising the solenoid coils S6 and S10 to cause the main ram 15 to retract. The button switches 174 and 175, respectively, operate the relays R1 and R2 for energising the solenoid coils S1 and S2, respectively, for operating the ram 83. The button switches 176 and 177, respectively, activate the relays R7 and R8 for energising the solenoid coils S7 and S8, respectively, for operating the ram 118. The button switch 178 activates the relay R9 which energises the solenoid coils S5, S9 and S10. This thus causes the main rams 14 and 15 to simultaneously extend. Operation of the button switch 179 activates the relay R10 which in turn energises the solenoid coils S6, S9 and S10 for simultaneously retracting the main rams 14 and 15.

Electrical circuitry for the control of the solenoid coils S3 and S4 of the hydraulic valve 192 is not illustrated. However, separate manually operated switches will be provided for the control of the solenoid coils S3 and S4. It is also envisaged in certain cases that the solenoid coils S3 and S4 of the hydraulic valve 192 may be controlled by suitable electrical circuitry for rocking the intermediate framework 12 relative to the base framework 2. Such circuitry may also control the solenoid coils S5 and S6 of the hydraulic valve 193 and also the solenoid coils S9 and S10 of the hydraulic valves 194 and 195.

Figure 19:
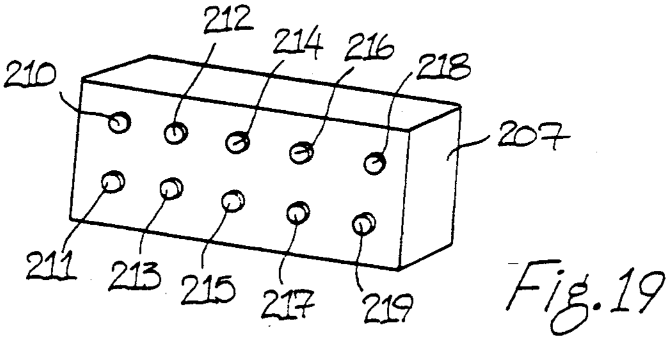
FIG. 19 is a perspective view of a still further portion of the bed of FIG. 1.

Switches X1 to X10 are also provided in the circuit in parallel with the relays R1 to R10 respectively for operating the solenoids in similar fashion as the relays R1 to R10. The switches X1 to X10 are controlled by respective circuits (not shown) which are activated by an infra-red signal received from a remote controller 207, see FIG. 19, which transmits infra-red signals for activating the switches X1 to X10. The remote controller 207 comprises a transmission circuit (not shown) for transmitting the infra-red signals for operating the switches X1 to X10. Button switches 210 to 219 on the controller 207 similar to the button switches 170 to 179 control the transmission circuit (not shown) for operating the switches X1 to X10. The button switches 210 to 219 correspond to the button switches 170 and 179 and operate the solenoid coils in similar fashion to the buttons 170 to 179. In other words, the button switch 210 causes the main ram 14 to extend, while the button switch 211 causes the main ram 14 to retract and so on.

In use, the bed 1 is set up with the mattresses 5 mounted on the mattress framework 7. Accessories or the like as desired may be attached to the appropriate accessory supports and mountings as desired.

To raise the intermediate framework 12 relative to the base framework 2, the button switch 178 is depressed for simultaneously raising the main rams 14 and 15 at the same rate. Activating the button switch 178 causes the piston rods 32 of the main ram 14 and 15 to extend for raising the intermediate framework 12 relative to the base framework 2. Where it is desired to lower the intermediate framework 12 the button switch 179 is depressed, causing the piston rods 32 of the main rams 14 and 15 to retract.

Where it is desired to tilt the intermediate framework 12 relative to the base framework 2, appropriate button switches of the button switches 170 to 173 are depressed. If it is desired to tilt the intermediate framework 12 by raising the head end 8 of the intermediate framework 12 only, then the button switch 170 is depressed, causing the piston rod 32 of the first main ram 14 to extend. Where a greater degree of tilt is desired and it is necessary to lower the foot end 9 of the intermediate framework 12 as well as raising the head end 8, the button switches 170 and 173 are both depressed, thus causing the piston rod 32 of the first main ram 14 to extend and the piston rod 32 of the second main ram 15 to retract. Where it is desired to tilt the intermediate framework 12 by lowering the foot end 9 of the intermediate framework 12 only, then the button switch 173 is depressed, thereby causing the piston rod 32 of the second main ram 15 to retract.

Where a reverse tilt is required, in other words, where it is desired to tilt the intermediate framework 12 with the foot end 9 higher than the head end 8, then the operation of the button switches 170 to 173 is reversed.

Where the desired degree of tilt has been achieved and it is desired to either raise or lower the intermediate framework 12 relative to the base framework 2 without affecting the angle of tilt, then the button switch 178 or 179 is depressed for respectively raising and lowering the intermediate framework 12.

To tilt the head frame 68 relative to the intermediate framework 12 and the central frame 67, the button switches 174 or 175 are operated. To tilt the head frame 68 upwardly, the button switch 174 is depressed, causing the piston rod 85 of the ram 83 to extend. To lower the head frame, the button switch 175 is depressed, thereby causing the piston rod 85 of the ram 83 to retract.

To pivot the central frame 67 relative to the intermediate framework 12, the central frame 67 is raised and the notch engaging members 114 of the cranked support members 108 are engaged in the appropriate notches 106 of the members 105 to give the desired angle of tilt. It is envisaged that tilting of the central frame 67 in this way may be carried out with or without the patient in the bed.

Figure 15:
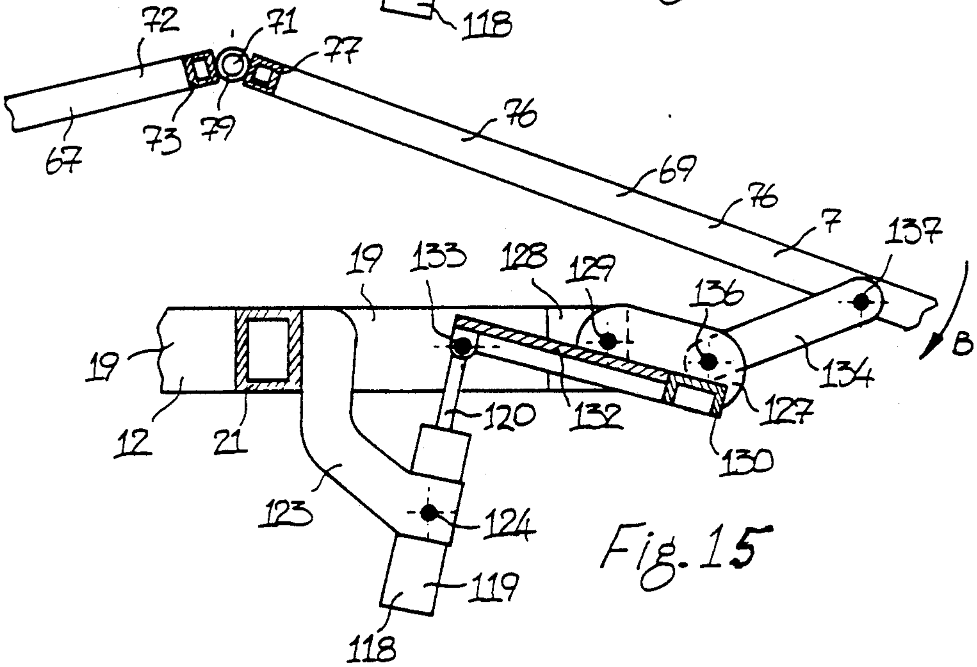
FIG. 15 is a view similar to FIG. 14 of the detail in a different position.
Figure 17:
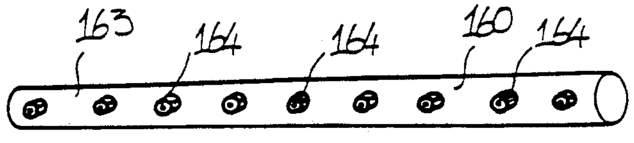
FIG. 17 is a perspective view of another portion of the bed of FIG. 1.
Figure 16:
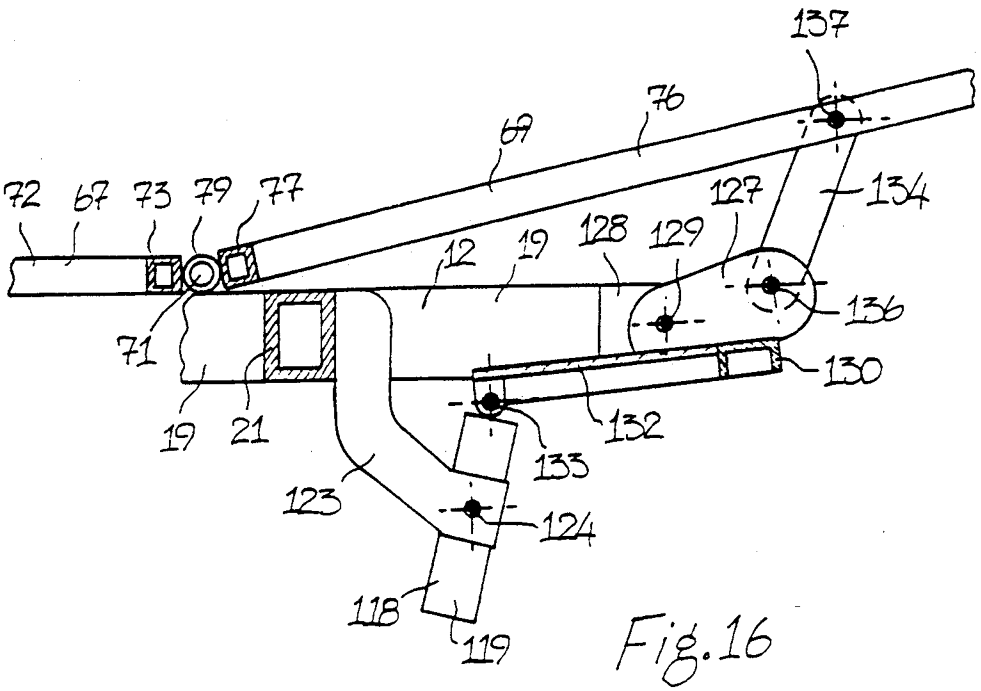
FIG. 16 is a view similar to FIG. 14 of the detail in a still further different position.

To tilt the foot frame 69 relative to the central frame 67, the button switches 176 or 177 are operated. Where it is desired to tilt the foot frame 69 upwardly relative to the central frame 67 as illustrated in FIG. 16, the button switch 177 is depressed, thereby causing the piston rod 120 of the secondary ram 118 to retract. Should pivoting of the foot frame 69 in the reverse direction be required, the button switch 176 is depressed, thereby causing the piston rod 120 of the secondary ram 118 to extend, see FIG. 15. It will be appreciated that where the foot frame 69 is pivoted downwardly as illustrated in FIG. 15 by the ram 118, as can be seen a certain amount of upward pivoting of the central frame is achieved. This can be achieved without the need for using the cranked support member 108.

Where a warm or cool air supply is desired to be provided over the patient, an appropriate air supply is connected to the inlet portion 165 of the manifold 160, which thus delivers air into the manifold 160 for delivering through the jets 164. Such an air supply, for example, may be obtained from a convector heater or blow heater or the like.

The bed according to the invention has many advantages. Firstly, by virtue of the fact that the intermediate framework is supported and operable by a pair of longitudinally spaced apart main hydraulic rams, a particularly advantageous construction of bed is provided. By virtue of the fact that the mattress framework is provided mounted on the intermediate framework, a large number of different positions of the head frame, foot frame and central frames are provided, considerably more than are provided in beds known heretofore. A particularly important advantage of the invention is achieved by virtue of the fact that the first main ram is pivotally mounted to the base framework about two spaced apart pivot axes.

A particularly important advantage of the invention is that by virtue of the construction of the bed a relatively high degree of tilt of the intermediate framework can be achieved, and furthermore, this in combination with the amount of relative tilt of the central head and foot frames of the mattress framework enables the bed to be used as a chair for carrying out surgical and other procedures and examinations. For example, it is envisaged that the bed may be used as a dentist's chair, a gynaecological chair, an operating table, an invalid chair, a physiotherapy chair and bed or the like.

It will be appreciated that while a particular construction of bed has been described, any other suitable construction may be provided without departing from the scope of the invention. It will of course be appreciated that while the bed has been described as comprising a mattress framework formed by three frames, the mattress framework could be provided in any number of frames more or less than three. Further, it will be appreciated that other constructions of intermediate framework could be provided, as indeed could other constructions of base framework be provided. It is further envisaged that other suitable pivot mounting arrangement for the first main ram on the base framework could be used. For example, in certain cases, it is envisaged that the first main ram may be pivotally connected directly onto the base framework. Needless to say, the positions of the first and second main rams may be reversed if desired. In other words, the first main ram may be mounted towards the foot end of the base framework and the second main ram may be mounted towards the head end.

It will of course be appreciated that while the rams have been described as being hydraulic rams, they could be pneumatic rams or operable by any other suitable fluid means. Furthermore, single acting rams may be provided.

Needless to say, while guide rods have been described for stablising the movement of the intermediate framework relative to the base framework, in many instances it is envisaged that the guide rods may be dispensed with altogether.

Needless to say, other suitable control circuitry could be provided without departing from the scope of the invention, and it is not necessary that the remote control circuit should be provided. Needless to say, other means for tilting the frames of the mattress framework could be used besides those described.

If desired, the arm 168 which carries the control panel 169 may be dispensed with and the control panel may be connected by a flexible cable or cord to the control circuitry. Needless to say, although not specifically described, wires from the control panel 169 are carried through the arm 168 and into the housing 184 where the control circuitry is provided.

If desired, guide means may also be provided between the intermediate framework and the pivot framework for stabilising the intermediate framework relative to the pivot framework. Needless to say, guide means other than those described for use with the second main ram may be used if desired.

It is envisaged in certain cases that the cranked support members on each side of the central frame may be connected by a linkage to facilitate simultaneous movement of the cranked support members.

Any other voltage besides a 24 volt AC supply may be used, and if desired a DC voltage supply may be used.

Another advantage of the construction of the bed according to the bed is that it permits beds of different size for accommodating different sizes of individuals to be produced without major difficulty.

We claim:

1. A bed having a head end and a foot end and comprising:

a base framework, a mattress framework extending longitudinally from the head end to the foot end for supporting a mattress, an intermediate framework for supporting the mattress framework, tilting means for tilting the intermediate framework relative to the base framework, the tilting means comprising:

longitudinally spaced apart first and second main rams connected between the base framework and the intermediate framework, the first main ram being pivotally connected to one of the said frameworks, and the main rams being independently operable relative to each other for tilting the intermediate framework relative to the base framework, wherein the first main ram is pivotally connected to the said framework about a pair of spaced apart, transversely disposed first and second pivot axes, the first main ram being pivotally connected to the base framework by an elongated pivot member pivotally connected to the base framework about the first pivot axis and depending downwardly therefrom, the pivot member pivotally carrying a pivot frame about the second pivot axis, the first main ram being rigidly connected to the pivot frame.

2. A bed as claimed in claim 1 in which each main ram comprises a cylinder and a piston slidable within the cylinder and a piston rod extending from the piston through the cylinder, the cylinder of the first main ram being rigidly connected to the pivot frame, and the cylinder of the second main ram being rigidly connected to the base framework, the piston rods of each main ram being pivotally connected to the intermediate framework.

3. A bed as claimed in claim 1 in which valve means are provided for independently operating the main rams for tilting of the intermediate framework relative to the base framework and for simultaneously moving the main rams for raising or lowering the intermediate framework relative to the base framework.

4. A bed as claimed in claim 1 in which the mattress framework comprises a central frame and a head frame pivotally connected to the central frame at one end thereof and a foot frame pivotally connected to the central frame at the other end thereof, the head and foot frames being pivotally connected to the central frame about transverse pivot axes, the head and central frames being pivotally connected to the intermediate framework about one of the transverse pivot axes, and means for pivoting the three frames relative to each other about the transverse pivot axes are provided.

5. A bed as claimed in claim 4 in which a first secondary ram mounted on the intermediate framework operatively engages the head frame for pivoting the head frame relative to the intermediate framework and the central frame, and a second secondary ram mounted on the intermediate framework operatively engages the foot frame for pivoting the foot frame relative to the central frame.

6. A bed as claimed in claim 1 in which the rams are hydraulically operated rams and control circuitry comprising valve means is provided for operating the hydraulic rams.

7. A bed as claimed in claim 6 in which remote control means are provided for remotely transmitting a signal for reception by the control circuitry for operating the control circuitry to operate the hydraulic rams.

8. A bed as claimed in claim 1 in which delivery means for delivering a fluid medium over the mattress framework is provided, the delivery means being mounted spaced apart above the mattress framework.

* * * * *